US012610420B2

(12) United States Patent
Yu et al.

(10) Patent No.: US 12,610,420 B2
(45) Date of Patent: Apr. 21, 2026

(54) METHOD AND DEVICE FOR DETERMINING AN RRC CONNECTION RE-ESTABLISHMENT PROCEDURE ACCORDING TO A TARGET CONDITION AND TIMERS

(71) Applicant: Apogee 5G Global, LLC, Plano, TX (US)

(72) Inventors: Qiaoling Yu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 371 days.

(21) Appl. No.: 18/107,025

(22) Filed: Feb. 8, 2023

(65) Prior Publication Data

US 2023/0262817 A1     Aug. 17, 2023

(30) Foreign Application Priority Data

Feb. 14, 2022     (CN) .......................... 202210131779.5

(51) Int. Cl.
H04W 76/19 (2018.01)
H04W 76/20 (2018.01)
H04W 76/30 (2018.01)

(52) U.S. Cl.
CPC .......... H04W 76/19 (2018.02); H04W 76/20 (2018.02); H04W 76/30 (2018.02)

(58) Field of Classification Search
CPC ..... H04W 76/19; H04W 76/20; H04W 76/30; H04W 36/0033; H04W 36/00;
(Continued)

(56) References Cited

U.S. PATENT DOCUMENTS

| | | | | |
|---|---|---|---|---|
| 2018/0092156 A1* | 3/2018 | Kim | ....................... | H04W 12/03 |
| 2020/0092939 A1* | 3/2020 | Kim | ....................... | H04W 76/19 |

(Continued)

FOREIGN PATENT DOCUMENTS

| | | | | |
|---|---|---|---|---|
| WO | WO-2018137255 A1 * | 8/2018 | .......... | H04L 63/061 |
| WO | 2021172964 A1 | 9/2021 | | |

OTHER PUBLICATIONS

Third Generation Partnership Project, "Technical Specification Group Radio Access Network; NR; Multiplexing and channel coding (Release 17)," 3GPP TS 38.212 V17.0.0 (Dec. 2021).

(Continued)

*Primary Examiner* — Mewale A Ambaye
(74) *Attorney, Agent, or Firm* — Volpe Koenig

(57) ABSTRACT

A method and user equipment (UE) configured for wireless communications. The UE is configured to receive information indicating a value of a first timer. The first timer is a timer related to small data transfer (SDT). The UE is configured to start the first timer based on a first message. The first message is used to request transmitting data through a data radio bearer (DRC) in a radio resource control (RRC) inactive state. The UE is configured to determine whether to execute an RRC connection re-establishment procedure based on at least a target condition being satisfied and a state of the first timer. The target condition is a condition in a condition set. The condition set comprises: receiving a random access problem indication from a master cell group (MCG) medium access control (MAC) and a state of at least a plurality of second timers.

20 Claims, 5 Drawing Sheets

(58) Field of Classification Search
CPC ..... H04W 40/36; H04W 52/02; H04W 76/27; H04W 74/0833; H04L 5/0053
See application file for complete search history.

(56) References Cited

U.S. PATENT DOCUMENTS

| | | | | |
|---|---|---|---|---|
| 2021/0136635 | A1* | 5/2021 | Kim ................... | H04W 28/0263 |
| 2021/0329511 | A1 | 10/2021 | Chen | |
| 2021/0337625 | A1 | 10/2021 | Tsai et al. | |
| 2022/0095410 | A1* | 3/2022 | Shih ....................... | H04W 76/27 |
| 2023/0072832 | A1* | 3/2023 | Jia ...................... | H04W 74/0825 |
| 2023/0100878 | A1* | 3/2023 | Zhang ................... | H04W 76/30 |
| | | | | 370/242 |
| 2023/0118008 | A1* | 4/2023 | Kim ...................... | H04L 5/0098 |
| | | | | 370/329 |
| 2023/0164773 | A1 | 5/2023 | Alfarhan et al. | |
| 2023/0262817 | A1* | 8/2023 | Yu ......................... | H04W 76/19 |
| | | | | 370/329 |
| 2023/0269811 | A1* | 8/2023 | Shibaike ............. | H04W 74/006 |
| | | | | 370/329 |

OTHER PUBLICATIONS

Third Generation Partnership Project, "Technical Specification Group Radio Access Network; NR; Physical layer procedures for data (Release 17)," 3GPP TS 38.214 V17.0.0 (Dec. 2021).

Third Generation Partnership Project, "Technical Specification Group Radio Access Network; NR; User Equipment (UE) procedures in Idle mode and RRC Inactive state (Release 16)," 3GPP TS 38.304 V16.7.0 (Dec. 2021).

Third Generation Partnership Project, "Technical Specification Group Radio Access Network; NR; Medium Access Control (MAC) protocol specification (Release 16)," 3GPP TS 38.321 V16.7.0 (Dec. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

* cited by examiner

100

First node

101 as response to target condition being satisfied, determining whether RRC connection re-establishment procedure is executed according to at least a state of first timer

5GS/EPS 200

F5.1
optional

F5.2
optional

U01.first node

S5101. target condition being satisfied

S5102(a). first timer not being running

S5102(b). first timer being running

S5103(a). executing RRC connection re-establishment procedure

S5103(b). not executing RRC connection re-establishment procedure

End

End

1100

1200

METHOD AND DEVICE FOR DETERMINING AN RRC CONNECTION RE-ESTABLISHMENT PROCEDURE ACCORDING TO A TARGET CONDITION AND TIMERS

CROSS REFERENCE TO RELATED APPLICATIONS

This application claims the priority benefit of Chinese Patent Application No. 202210131779.5, filed on Feb. 14, 2022, the full disclosure of which is incorporated herein by reference.

BACKGROUND

Technical Field

The present application relates to transmission methods and devices in wireless communication systems, and in particular to a transmission method and device related to small packets.

Related Art

New Radio (NR) supports Radio Resource Control (RRC)_ INACTIVE State, and the RRC_INACTIVE State does not support transmitting data until 3rd Generation Partnership Project (3GPP) Release 16 (R16). When a User Equipment (UE) needs to transmit periodic or aperiodic infrequent small packets in the RRC_INACTIVE state, it needs to resume connection first, that is, switch to RRC_ CONNECTED state, and then switch to the RRC_INAC-TIVE state after finishing transmitting data. 3GPP RAN #86th meeting decided to carry out a Work Item (WI) of "Small Data Transmission (SDT) in NR RRC_INACTIVE State" to study small packet transmission technology in RRC_INACTIVE state, comprising transmitting uplink data on pre-configured Physical Uplink Shared Channel (PUSCH) resources, or utilizing Message 3 (Msg3) or Message B (MsgB) in a Random Access (RA) procedure to carry data.

SUMMARY

Before Release 17 (R17), when a UE is in RRC_INAC-TIVE State, and if there is data to be transmitted, the UE initiates an RRC resume procedure, transmits RRCResum-eRequest or RRCResumeRequest1 message to a base station, after receiving an RRCResume message responded by the base station, re-activates Access Stratum (AS) security; R17 has introduced an SDT, when the UE is in RRC_I-NACTIVE State, and if there is data to be transmitted, the UE initiates an RRCresume procedure, before transmitting RRCResumeRequest or RRCResumeRequest1 message to the base station, re-activates AS security, and resumes at least a former of a Data Radio Bearer (DRB) or a Signalling Radio Bearer 2 (SRB2). During an SDT, if link problems are detected, such as a random access problem occurs, or a number of Radio Link Control (RLC) retransmissions reaches a maximum value, or a continuous uplink Listen Before Talk (LBT) failure occurs, since UE security has been activated and DRB or SRB2 has been established, the UE will executed an RRC connection re-establishment pro-cedure according to the existing protocol. Since SDT is a transmission in RRC_INACTIVE State, the implementation of the RRC connection re-establishment procedure is not applicable to the SDT. How to avoid the implementation of the RRC connection re-establishment when link problems are detected during SDT needs to be enhanced.

To address the above problem, the present application provides a solution. In view of the above problem, NR SDT scenario is used as an example; the present application is also applicable to scenarios such as LTE or Narrow Band Internet of Things (NB-IoT), where similar technical effects can be achieved. Additionally, the adoption of a unified solution for various scenarios contributes to the reduction of hardware complexity and costs.

In one embodiment, interpretations of the terminology in the present application refer to definitions given in the 3GPP TS38 series.

In one embodiment, interpretations of the terminology in the present application refer to definitions given in Institute of Electrical and Electronics Engineers (IEEE) protocol specifications.

It should be noted that if no conflict is incurred, embodi-ments in any node in the present application and the char-acteristics of the embodiments are also applicable to any other node, and vice versa. And the embodiments in the present application and the characteristics in the embodi-ments can be arbitrarily combined if there is no conflict.

The present application provides a method in a first node for wireless communications, comprising:

as a response to a target condition being satisfied, deter-mining whether an RRC connection re-establishment procedure is executed according to at least a state of a first timer;

herein, the behavior of determining whether an RRC connection re-establishment procedure is executed according to a state of a first timer comprises: when the first timer is not running, executing the RRC connec-tion re-establishment procedure; when the first timer is running, not executing the RRC connection re-estab-lishment procedure; a start condition of the first timer is related to a first message, the first message is used to request transmitting data through a DRB in RRC_I-NACTIVE state, accompanying the first message, at least one DRB is resumed; the target condition is any condition in a first condition set, and the first condition set comprises at least one condition; one condition in the first condition set comprises receiving a random access problem indication of a Master Cell Group (MCG) Medium Access Control (MAC).

In one embodiment, a problem to be solved in the present application comprises: how to optimize standard protocol.

In one embodiment, a problem to be solved in the present application comprises: how to avoid an RRC connection re-establishment.

In one embodiment, a problem to be solved in the present application comprises: if AS security is activated and at least one DRB is established, how to avoid an RRC connection re-establishment when a radio link problem is detected.

In one embodiment, a problem to be solved in the present application comprises: during an SDT transmission, how to avoid an RRC connection re-establishment.

In one embodiment, a problem to be solved in the present application comprises: during an SDT transmission, how to avoid RRC connection re-establishment when a radio link problem is detected.

In one embodiment, characteristics of the above method comprise: when a radio link problem is detected, determin-ing whether an RRC connection re-establishment procedure is executed according to whether SDT procedure is being executed.

In one embodiment, characteristics of the above method comprise: when a radio link problem is detected, determining whether an RRC connection re-establishment procedure is executed according to whether a timer used to monitor an SDT failure is running.

In one embodiment, characteristics of the above method comprise: as a response to a target condition being satisfied, only when the first timer is not running, executing the RRC connection re-establishment procedure.

In one embodiment, characteristics of the above method comprise: when the first timer is not running, executing the RRC connection re-establishment procedure; when the first timer is running, entering into RRC_IDLE state.

In one embodiment, characteristics of the above method comprise: each condition in the first condition set is used to determine that a radio link problem occurs.

In one embodiment, characteristics of the above method comprise: as a response to receiving a random access problem indication from an MCG MAC, and when the first timer is not running, executing the RRC connection re-establishment procedure; when the first timer is running, not executing the RRC connection re-establishment procedure.

In one embodiment, characteristics of the above method comprise: as a response to receiving a random access problem indication from an MCG MAC, any of timers T300, T301, T304, T311 and T319 is not running, and when the first timer is not running, executing the RRC connection re-establishment procedure; when the first timer is running, not executing the RRC connection re-establishment procedure.

In one embodiment, characteristics of the above method comprise: receiving a random access problem indication from an MCG MAC is used to determine that the target condition is satisfied.

In one embodiment, characteristics of the above method comprise: a random access problem indication is received from an MCG MAC, and any of timers T300, T301, T304, T311 and T319 not being running is used to determine that the target condition is satisfied.

In one embodiment, advantages of the above method comprise: avoiding triggering an RRC connection re-establishment procedure during an SDT.

In one embodiment, advantages of the above method comprise: avoiding triggering an RRC connection re-establishment procedure when a radio link problem is detected during an SDT.

According to one aspect of the present application, wherein one condition in the first condition set comprises receiving an indication of a number of RLC retransmissions reaching a maximum value from MCG RLC.

In one embodiment, characteristics of the above method comprise: receiving an indication of a number of RLC retransmissions reaching a maximum value from MCG RLC is used to determine that the target condition is satisfied.

In one embodiment, characteristics of the above method comprise: as a response to receiving an indication of a number of RLC retransmissions reaching a maximum value from MCG RLC, when the first timer is not running, executing the RRC connection re-establishment procedure; when the first timer is running, not executing the RRC connection re-establishment procedure.

According to one aspect of the present application, wherein one condition in the first condition comprises receiving an indication of continuous uplink LBT failure from an MCG MAC.

In one embodiment, characteristics of the above method comprise: receiving an indication of continuous uplink LBT failure from an MCG MAC being used to determine that the target condition is satisfied.

In one embodiment, characteristics of the above method comprise: as a response to receiving an indication of continuous uplink LBT failure from an MCG MAC, when the first timer is not running, executing the RRC connection re-establishment procedure; when the first timer is running, not executing the RRC connection re-establishment procedure.

According to one aspect of the present application, wherein one condition in the first condition set comprises that time T310 is expired.

In one embodiment, characteristics of the above method comprise: the timer T310 being expired is used to determine that the target condition is satisfied.

In one embodiment, characteristics of the above method comprise: as a response to timer T310 being expired, when the first timer is not running, executing the RRC connection re-establishment procedure; when the first timer is running, not executing the RRC connection re-establishment procedure.

According to one aspect of the present application, comprising:

as a response to determining executing an RRC connection re-establishment procedure, transmitting a first signaling, the first signaling being used to request an RRC connection re-establishment;

herein, when the target condition is satisfied, the first timer is not running.

According to one aspect of the present application, comprising:

transmitting the first message; accompanying the first message, starting the first timer; and before entering into RRC_IDLE state, resetting a MAC, and indicating an RRC connection release to a higher layer;

herein, when the target condition is satisfied, the first timer is running; the behavior of not executing the RRC connection re-establishment procedure comprises entering into the RRC_IDLE state.

The present application provides a method in a second node for wireless communications, comprising:

receiving a first signaling, or, receiving a first message;

herein, as a response to a target condition being satisfied, at least a state of a first timer is used to determine whether an RRC connection re-establishment procedure is executed; the phrase of at least a state of a first timer being used to determine whether an RRC connection re-establishment procedure is executed comprises: when the first timer is not running, the RRC connection re-establishment procedure is executed; when the first timer is running, the RRC connection re-establishment procedure is not executed; the RRC connection re-establishment procedure being determined to be executed is used to trigger the first signaling, and the first signaling is used to request an RRC connection re-establishment; accompanying the first message being transmitted, the first timer is started; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

According to one aspect of the present application, wherein one condition in the first condition set comprises receiving an indication of a number of RLC retransmissions reaching a maximum value from MCG RLC.

According to one aspect of the present application, wherein one condition in the first condition comprises receiving an indication of continuous uplink LBT failure from an MCG MAC.

According to one aspect of the present application, wherein one condition in the first condition set comprises that time T310 is expired.

According to one aspect of the present application, wherein the phrase of the RRC connection re-establishment procedure not being executed comprises entering into RRC_IDLE state; before entering into the RRC_IDLE state, a MAC is reset, and an RRC connection release is indicated to a higher layer.

The present application provides a first node for wireless communications, comprising:

a first receiver, as a response to a target condition being satisfied, determining whether an RRC connection re-establishment procedure is executed according to at least a state of a first timer;

herein, the behavior of determining whether an RRC connection re-establishment procedure is executed according to a state of a first timer comprises: when the first timer is not running, executing the RRC connection re-establishment procedure; when the first timer is running, not executing the RRC connection re-establishment procedure; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

The present application provides a second node for wireless communications, comprising:

a second receiver, receiving a first signaling, or, receiving a first message;

herein, as a response to a target condition being satisfied, at least a state of a first timer is used to determine whether an RRC connection re-establishment procedure is executed; the phrase of at least a state of a first timer being used to determine whether an RRC connection re-establishment procedure is executed comprises: when the first timer is not running, the RRC connection re-establishment procedure is executed; when the first timer is running, the RRC connection re-establishment procedure is not executed; the RRC connection re-establishment procedure being determined to be executed is used to trigger the first signaling, and the first signaling is used to request an RRC connection re-establishment; accompanying the first message being transmitted, the first timer is started; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the present application has the following advantages over conventional schemes:

avoiding triggering an RRC connection re-establishment procedure during an SDT;

avoiding triggering an RRC connection re-establishment procedure when a radio link problem is detected during an SDT;

reducing the difficulty of standard protocol optimization.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
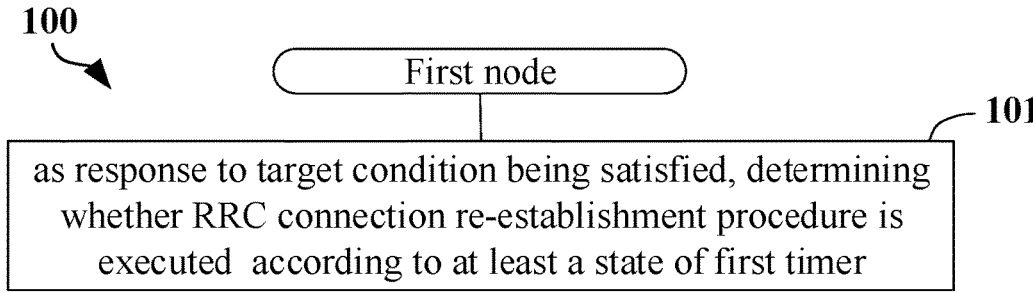
FIG. 1 illustrates a flowchart according to one embodiment of the present application.

Embodiment 1 illustrates a flowchart according to one embodiment of the present application, as shown in FIG. 1. In FIG. 1, each step represents a step, it should be particularly noted that the sequence order of each box herein does not imply a chronological order of steps marked respectively by these boxes.

In embodiment 1, a first node in the present application in step 101, as a response to a target condition being satisfied, determines whether an RRC connection re-establishment procedure is executed according to at least a state of a first timer; herein, the behavior of determining whether an RRC connection re-establishment procedure is executed according to a state of a first timer comprises: when the first timer is not running, executing the RRC connection re-establishment procedure; when the first timer is running, not executing the RRC connection re-establishment procedure; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, any condition in the first condition set being satisfied is used to determine that the target condition is satisfied.

In one embodiment, at least one condition in the first condition set being satisfied is used to determine that the target condition is satisfied.

In one embodiment, the phrase of as a response to a target condition being satisfied comprises: when the target condition being satisfied is determined.

In one embodiment, the phrase of as a response to a target condition being satisfied comprises: as a response to determining that a target condition is satisfied.

In one embodiment, the phrase of as a response to a target condition being satisfied comprises: when the target condition is satisfied.

In one embodiment, the phrase of as a response to a target condition being satisfied comprises: if the target condition is satisfied.

In one embodiment, the expiration value of the first timer is configured through an RRC message.

In one embodiment, the expiration value of the first timer is configured through an RRC Information Element (IE) in an RRC message.

In one embodiment, the expiration value of the first timer is configured through an RRC field in an RRC message.

In one embodiment, the expiration value of the first timer is configured through an RRCRelease message.

In one embodiment, the expiration value of the first timer is configured through an RRCRelease message.

In one embodiment, the first timer is not T319.

In one embodiment, the first timer is not T300.

In one embodiment, the first timer is not any of T300, T301, T304, T311 and T319.

In one embodiment, a name of the first timer comprises T319.

In one embodiment, a name of the first timer does not comprise T319.

In one embodiment, a name of the first timer comprises T319, and a name of the first timer is not T319.

In one embodiment, the first timer is T319-r18.

In one embodiment, the first timer is T319a.

In one embodiment, the first timer is T319b.

In one embodiment, the first timer is T319s.

In one embodiment, the first timer is at least one of T319 or sdt or mo.

In one embodiment, the first timer belongs to an MCG.

In one embodiment, the first timer belongs to a Primary Cell (PCell).

In one embodiment, the behavior of determining whether an RRC connection re-establishment is executed according to at least a state of a first timer comprises: whether an RRC connection re-establishment procedure is executed is determined only according to the state of the first timer.

In one embodiment, the behavior of determining whether an RRC connection re-establishment is executed according to at least a state of a first timer comprises: whether an RRC connection re-establishment procedure is executed is determined according to the state of the first timer and a state of another timer.

In one embodiment, the behavior of determining whether an RRC connection re-establishment is executed according to at least a state of a first timer comprises: whether an RRC connection re-establishment procedure is executed is determined according to whether the first timer is running.

In one embodiment, the behavior of determining whether an RRC connection re-establishment is executed according to at least a state of a first timer comprises: whether an RRC connection re-establishment procedure is executed is determined according to whether the first timer is running.

In one embodiment, the state of the first timer refers to that the first timer is running or the first timer is not running.

In one embodiment, the state of the first timer comprises that the first timer is running.

In one embodiment, the state of the first timer comprises that the first timer is not running.

In one embodiment, the first timer not being running comprises that the first timer is not started.

In one embodiment, the first timer not being running comprises that the first timer is expired.

In one embodiment, the first timer not being running does not comprises that the first timer is expired.

In one embodiment, the first timer not being running refers to: the first timer is not timing.

In one embodiment, the first timer not being running refers to: timing of the first timer does not change with time.

In one embodiment, the first timer being running refers to: the first timer is timing.

In one embodiment, the first timer being running refers to: timing of the first timer changes with time.

In one embodiment, the first timer being running refers to: the first timer is started, the first timer is not stopped, and the first timer does not reach an expiration value of the first timer.

In one embodiment, the RRC connection re-establishment procedure is used to re-establish an RRC connection.

In one embodiment, as a response to initialing the RRC connection re-establishment procedure, and if timer T310 is running, timer T310 is stopped.

In one embodiment, as a response to initialing the RRC connection re-establishment procedure, and if timer T312 is running, timer T312 is stopped.

In one embodiment, as a response to initialing the RRC connection re-establishment procedure, and if timer T304 is running, timer T304 is stopped.

In one embodiment, as a response to initialing the RRC connection re-establishment procedure, and if timer T316 is running, timer T316 is stopped.

In one embodiment, as a response to initialing the RRC connection re-establishment procedure, timer T311 is stopped.

In one embodiment, as a response to initialing the RRC connection re-establishment procedure, a cell selection is executed according to 3GPP TS 38.304.

In one embodiment, the behavior of executing a cell selection is used to select a target cell.

In one embodiment, the behavior of not executing the RRC connection re-establishment procedure refers to that the RRC connection re-establishment procedure is not initiated.

In one embodiment, the behavior of not executing the RRC connection re-establishment procedure comprises: entering into RRC_IDLE state.

In one embodiment, the behavior of not executing the RRC connection re-establishment procedure refers to: entering into RRC_IDLE state.

In one embodiment, the RRC_INACTIVE state is RRC_INACTIVE state.

In one embodiment, the RRC_INACTIVE state is not RRC_IDLE state.

In one embodiment, the phrase of a start condition of the first timer being related to a first message comprises: transmitting the first message being used to start the first timer.

In one embodiment, the phrase of a start condition of the first timer being related to a first message comprises: preparing to transmit the first message being used to start the first timer.

In one embodiment, the phrase of a start condition of the first timer being related to a first message comprises: before initiating a transmission procedure of the first message, the first timer is started.

In one embodiment, the phrase of a start condition of the first timer being related to a first message comprises: before resumeIdentity in the first message is set, the first timer is started.

In one embodiment, the phrase of a start condition of the first timer being related to a first message comprises: in the procedure of setting contents of the first message, the first timer is started.

In one embodiment, the phrase of a start condition of the first timer being related to a first message comprises: before setting contents of the first message, the first timer is started.

In one embodiment, the DRB is identified by a DRB-Identity.

In one embodiment, the phrase of transmitting data through a DRB in RRC_INACTIVE state refers to an SDT.

In one embodiment, the phrase of the first message being used to request transmitting data through a DRB in RRC_INACTIVE state refers to: the first message is used for an SDT.

In one embodiment, all conditions in a given condition set being satisfied is used to determine transmitting the first message.

In one embodiment, one condition in the given condition set comprises: a higher layer requests resuming an RRC connection.

In one embodiment, one condition in the given condition set comprise: the first node supporting an SDT.

In one embodiment, one condition in the given condition set comprise: System Information Block 1 (SIB1) comprising sdt-ConfigCommon.

In one embodiment, one condition in the given condition set comprise: all pending data being mapped to a DRB used for an SDT.

In one embodiment, one condition in the given condition set comprise: lower layer indicating that conditions initiating an SDT are satisfied.

In one embodiment, the given condition set comprises: a higher layer requests resuming an RRC connection, and the first node supports SDT, and SIB1 comprises sdt-Config- Common, and all pending data is mapped to a DRB used for an SDT, and a lower layer indicates that conditions initiating an SDT are satisfied.

In one embodiment, the first message is used for an RRC connection resume procedure, and the RRC connection resume procedure is used for an SDT.

In one embodiment, the first message comprises an uplink signaling.

In one embodiment, a signaling radio bearer of the first message is Signalling Radio Bearer 0 (SRB0).

In one embodiment, a logical channel of the first message is a Common Control Channel (CCCH).

In one embodiment, the first message comprises all or part of a higher layer signaling.

In one embodiment, the first message comprises an RRC message.

In one embodiment, the first message is an RRCResumeRequest message.

In one embodiment, the first message is an RRCResumeRequest1 message.

In one embodiment, the first message comprises an IE in an RRC message, and a name of the IE comprises I-RNTI-Value.

In one embodiment, the first message comprises a field in an RRC message, and a name of the field comprises resume-MAC-I.

In one embodiment, the first message comprises a field in an RRC message, and a name of the field comprises resume-Identity.

In one embodiment, the first message comprises a field in an RRC message, and a name of the field comprises resume-Cause.

In one embodiment, the first message comprises an IE in an RRC message, and a name of the IE comprises resume-Cause.

In one embodiment, a target message being received is used to determine stopping the first timer; the target message is a response for the first message, and the target message is an RRC message.

In one embodiment, the target message is an RRCRelease message.

In one embodiment, the target message is an RRCRelease message, and the RRCRelease message comprises suspendConfig.

In one embodiment, the target message is an RRCReject message.

In one embodiment, the target message is an RRCSetup message.

In one embodiment, the target message is an RRCResume message.

In one embodiment, the first node executing a cell reselection is used to determine stopping the first timer.

In one embodiment, abortion of connection establishment by a higher layer of the first node is used to determine stopping the first timer.

In one embodiment, the phrase of "accompanying the first message, at least one DRB being recovered" comprises: after contents of the first message are set, resuming the at least one DRB.

In one embodiment, the at least one DRB is configured for an SDT.

In one embodiment, the at least one DRB is all DRBs configured for an SDT.

In one embodiment, the at least one DRB is indicated by a sdt-DRB-List.

In one embodiment, each DRB in the at least one DRB is identified by a DRB-Identity.

In one embodiment, the at least one DRB is indicated in an RRCRelease message.

In one embodiment, the at least one DRB is indicated in SDT-Config.

In one embodiment, the at least one DRB is indicated in an RRC field whose name comprises SDT-Config.

In one embodiment, the first condition set only comprises one condition, and the condition comprises receiving a random access problem indication from an MCG MAC.

In one embodiment, the first condition set at least comprises two conditions.

In one embodiment, one condition in the first condition set comprises receiving a random access problem indication from an MCG MAC.

In one embodiment, one condition in the first condition set comprises receiving an indication of a number of RLC retransmissions reaching a maximum value from MCG RLC.

In one embodiment, one condition in the first condition set comprises receiving an indication of continuous uplink LBT failure from an MCG MAC.

In one embodiment, one condition in the first condition set comprises that timer T310 is expired.

In one embodiment, any condition in the first condition set does not comprise receiving a random access problem indication from an MCG MAC.

In one embodiment, any condition in the first condition set does not comprise receiving an indication of a number of RLC retransmissions reaching a maximum value from MCG RLC.

In one embodiment, any condition in the first condition set does not comprise receiving an indication of continuous uplink LBT failure from an MCG MAC.

In one embodiment, any condition in the first condition set does not comprise that timer T310 is expired.

In one embodiment, one condition in the first condition set comprising receiving a random access problem indication from an MCG MAC refers to: one condition in the first condition set is receiving a random access problem indication from an MCG MAC.

In one embodiment, one condition in the first condition set comprising receiving a random access problem indication from an MCG MAC refers to: one condition in the first condition set is receiving a random access problem indication from an MCG MAC, and any of timers T300, T301, T304, T311 and T319 is not running.

In one embodiment, one condition in the first condition set comprising receiving a random access problem indication from an MCG MAC refers to: one condition in the first condition set is receiving a random access problem indication from an MCG MAC, and any of timers T300, T301, T304, T311 and T319 is not running, and an uplink transmission of a random access procedure associated with the random access problem indication does not carry a CCCH Service Data Unit (SDU) comprising the first message.

In one embodiment, when a random access problem indication from an MCG MAC is received, the target condition is satisfied.

In one embodiment, when a random access problem indication from an MCG MAC is received, and any of timers T300, T301, T304, T311 and T319 is not running, the target condition is satisfied.

In one embodiment, when a random access problem indication from an MCG MAC is received, and any of timers T300, T301, T304, T311 and T319 is not running, and an uplink transmission of a random access procedure associated with the random access problem indication does not carry a CCCH SDU comprising the first message, the target condition is satisfied.

In one embodiment, the meaning of the random access procedure associated with the random access problem indication refers to: the random access problem indication is transmitted in the random access procedure.

In one embodiment, the meaning of the random access procedure associated with the random access problem indication refers to: the random access problem indication is for the random access procedure.

In one embodiment, an uplink transmission of a random access procedure associated with the random access problem indication not carrying a CCCH SDU of comprising the first message refers to: Msg3 of a random access procedure associated with the random access problem indication does not carry a CCCH SDU comprising the first message.

In one embodiment, an uplink transmission of a random access procedure associated with the random access problem indication not carrying a CCCH SDU comprising the first message refers to: MSGB of a random access procedure associated with the random access problem indication does not carry a CCCH SDU comprising the first message.

In one embodiment, the phrase of "as a response to a target condition being satisfied, determining whether an RRC connection re-establishment procedure is executed according to whether a first timer is running" comprising: only when the target condition is satisfied and the first timer is not running, executing the RRC connection re-establishment procedure.

In one embodiment, the phrase of "as a response to a target condition being satisfied, determining whether an RRC connection re-establishment procedure is executed according to whether a first timer is running" comprising: when the target condition is satisfied, and if the first timer is not running, executing the RRC connection re-establishment procedure; if the first timer is running, not executing the RRC connection re-establishment procedure.

In one embodiment, the phrase of "as a response to a target condition being satisfied, determining whether an RRC connection re-establishment procedure is executed according to whether a first timer is running" comprising: when the target condition is satisfied, and if the first timer is not running, executing the RRC connection re-establishment procedure; if the first timer is running, entering into RRC_IDLE state.

In one embodiment, the phrase of "when the first timer is not running, executing the RRC connection re-establishment procedure; when the first timer is running, not executing the RRC connection re-establishment procedure" can be replaced as: only when the first timer is not running, executing the RRC connection re-establishment procedure.

In one embodiment, the phrase of "when the first timer is not running, executing the RRC connection re-establishment procedure; when the first timer is running, not executing the RRC connection re-establishment procedure" can be replaced as: when the first timer is not running, executing the RRC connection re-establishment procedure; when the first timer is running, entering into RRC_IDLE state.

In one embodiment, the phrase of one condition in the first condition set comprising receiving a random access problem indication from an MCG MAC comprises: one condition in the first condition set comprises receiving a random access problem indication from an MCG MAC, and any of timers T300, T301, T304, T311 and T319 is not running.

In one embodiment, the phrase of one condition in the first condition set comprising receiving a random access problem indication from an MCG MAC comprises: one condition in the first condition set comprises that when any of timers T300, T301, T304, T311 and T319 is not running, a random access problem indication from an MCG MAC is received.

In one embodiment, for the T300, the T301, the T304, the T311 and the T319, refer to 3GPP TS 38.331.

In one embodiment, when the target condition is satisfied, and if the first timer is not running, execute the RRC connection re-establishment procedure; if the first timer is running, enter into RRC_IDLE state; herein, AS security of the first node is activated, and at least the target bearer is established.

In one embodiment, AS security of the first node is activated; the AS security comprises integrity protection and encryption of an RRC signaling and user data.

In one embodiment, at least one DRB of the first node is established.

In one embodiment, an SRB2 of the first node is established.

In one embodiment, an SRB2 and at least one DRB are established.

In one embodiment, the at least one DRB and an SRB2 are associated with an MCG.

In one embodiment, the first node is not configured with a Carrier Aggregation (CA).

In one embodiment, the first node being not configured with a CA refers to: an MCG of the first node only comprises a PCell.

In one embodiment, the first node is configured with a CA.

In one embodiment, the first node being not configured with a CA refers to: an MCG of the first node comprises a PCell and at least one SCell.

In one embodiment, the first node is not configured with a CA duplication.

In one embodiment, the first node is configured with a CA duplication, and is not activated for an MCG.

In one embodiment, the first node is configured with a CA duplication, and is activated for an MCG, as well as for a corresponding logical channel allowedServingCells only includes a PCell.

In one embodiment, the first node is configured with a CA duplication.

In one embodiment, the first node is configured with a CA duplication, and is activated for an MCG.

In one embodiment, the first node is configured with a CA duplication, and is activated for an MCG, as well as for a corresponding logical channel allowedServingCells only includes an SCell.

In one embodiment, the first node is configured with a CA duplication, and is activated for an MCG, as well as for a corresponding logical channel allowedServingCells only includes a PCell.

In one embodiment, the first node is configured with a CA duplication, and is activated for an MCG, as well as for a corresponding logical channel allowedServingCells only includes an SCell and a PCell.

In one embodiment, the first node is not configured with T316; when the target condition is satisfied, the first timer is not running.

In one embodiment, the first node is configured with a Secondary Cell Group (SCG), and the SCG is suspended; the target condition is satisfied, and the first timer is not running.

In one embodiment, the first node is configured with an SCG, and PSCell change or PSCell insertion is being executed (that is, timer T304 for an NR PSCell of an NR-NR Dual Connectivity (NR-DC) or timer T307 for a E-UTRA PSCell of an NR E-UTRA Dual Connectivity (NE-DC) is not running); when the target condition is satisfied, the first timer is not running.

In one embodiment, the first node is not configured an SCG; the target condition is satisfied, and the first timer is not running.

In one embodiment, the first node is not configured with T316, or an SCG is suspended, or PSCell change or PSCell insertion is being executed (that is, timer T304 for an NR PSCell of an NR-DC or timer T307 for a E-UTRA PSCell of an NE-DC is not running); when the target condition is satisfied, the first timer is not running.

In one embodiment, when any condition in the first condition set is satisfied, the first timer is running.

In one embodiment, when any condition in the first condition set is satisfied, the first timer is not running.

In one embodiment, when any condition in the first condition set is satisfied, the first node is in RRC_CONNECTED state.

In one embodiment, when any condition in the first condition set is satisfied, the first node is in RRC_INACTIVE state.

In one embodiment, the T300, the T301, the T304, the T311 and the T319 belong to an MCG.

Embodiment 2

Figure 2:
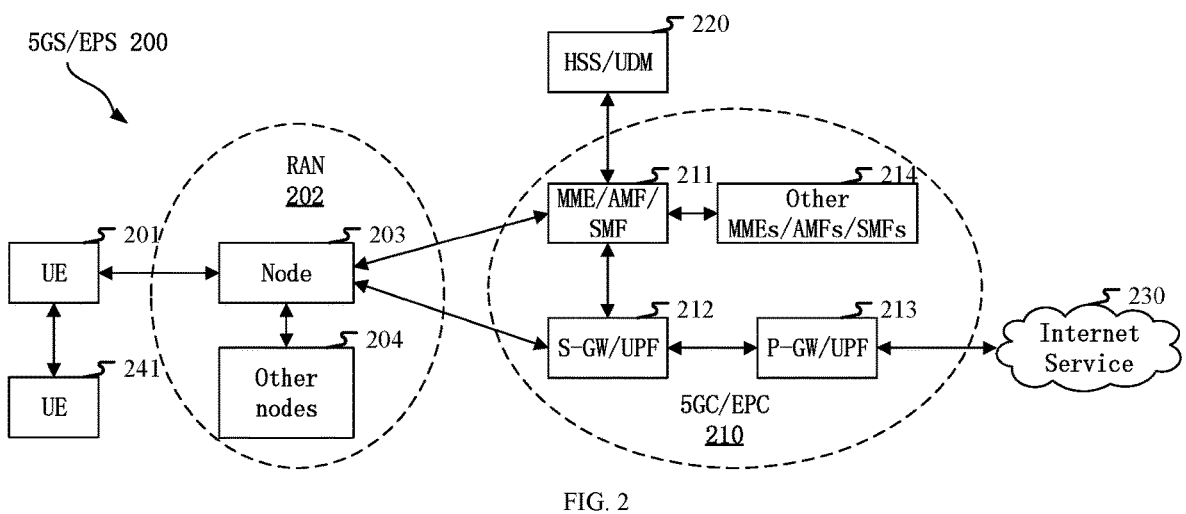
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR/Long-Term Evolution (LTE)/Long-Term Evolution Advanced (LTE-A) systems. The 5G NR/LTE/LTE-A network architecture 200 may be called a 5G System (5GS)/Evolved Packet System (EPS) 200 or other appropriate terms. The 5GS/EPS 200 comprises at least one of a UE 201, an RAN 202, a 5G Core Network/Evolved Packet Core (5GC/EPC) 210, a Home Subscriber Server (HSS)/Unified Data Management (UDM) 220 or an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The RAN comprises the node 203 and other nodes 204. The node 203 provides UE 201-oriented user plane and control plane protocol terminations. The node 203 may be connected to other nodes 204 via an Xn interface (e. g., backhaul)/X2 interface. The node 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The node 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The node 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 is a UE.

In one embodiment, the node 203 corresponds to the second node in the present application.

In one embodiment, the node 203 is a BaseStation (BS).

In one embodiment, the node 203 is a Base Transceiver Station (BTS).

In one embodiment, the node 203 is a NodeB (NB).

In one embodiment, the node 203 is a gNB.

In one embodiment, the node 203 is an eNB.

In one embodiment, the node 203 is a ng-eNB.

In one embodiment, the node 203 is an en-gNB.

In one embodiment, the node 203 is a UE.

In one embodiment, the node 203 is a relay.

In one embodiment, the node 203 is a gateway.

In one embodiment, the UE supports Terrestrial Network (NTN) transmission.

In one embodiment, the UE supports Non-Terrestrial Network (NTN) transmission.

In one embodiment, the UE supports communications within networks with large latency difference.

In one embodiment, the UE supports Dual Connection (DC) transmission.

In one embodiment, the UE comprises an aircraft.

In one embodiment, the UE comprises a vehicle terminal.

In one embodiment, the UE comprises a vessel.

In one embodiment, the UE comprises an Internet of Things (IoT) terminal.

In one embodiment, the UE comprises an industrial Internet of Things (IoT) terminal.

In one embodiment, the UE comprises a device supporting transmission with low-latency and high-reliability.

In one embodiment, the UE comprises a test equipment.

In one embodiment, the UE comprises a signaling tester.

In one embodiment, the base station supports transmission over a non-terrestrial network.

In one embodiment, the base station supports transmission over networks with large latency difference.

In one embodiment, the base station supports transmission over a terrestrial network.

In one embodiment, the base station comprises a Marco Cellular base station.

In one embodiment, the base station comprises a Micro Cell base station.

In one embodiment, the base station comprises a Pico Cell base station.

In one embodiment, the base station comprises a Femtocell.

In one embodiment, the base station comprises a base station supporting large latency difference.

In one embodiment, the base station comprises a flight platform equipment.

In one embodiment, the base station comprises a satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises a test equipment.

In one embodiment, the base station comprises a signaling tester.

In one embodiment, the base station comprises an Integrated Access and Backhaul (IAB)-node.

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises an L3 relay.

In one embodiment, the relay comprises an L2 relay.

In one embodiment, the relay comprises a router.

In one embodiment, the relay comprises a switch.

In one embodiment, the relay comprises a UE.

In one embodiment, the relay comprises a base station.

Embodiment 3

Figure 3:
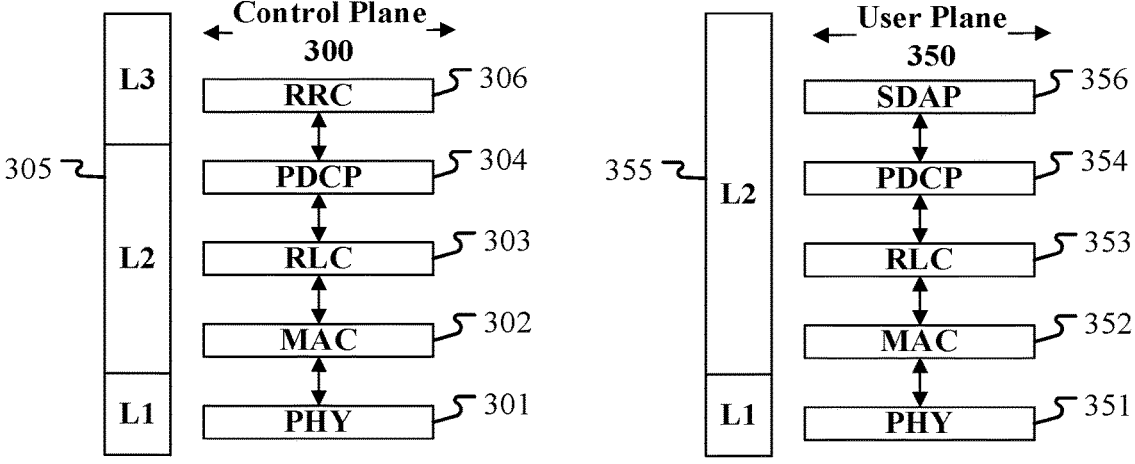
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present application. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the first message in the present application is generated by the RRC 306.

In one embodiment, the target signaling in the present application is generated by the RRC 306.

In one embodiment, the target message in the present application is generated by the RRC 306.

Embodiment 4

Figures 4, 5:
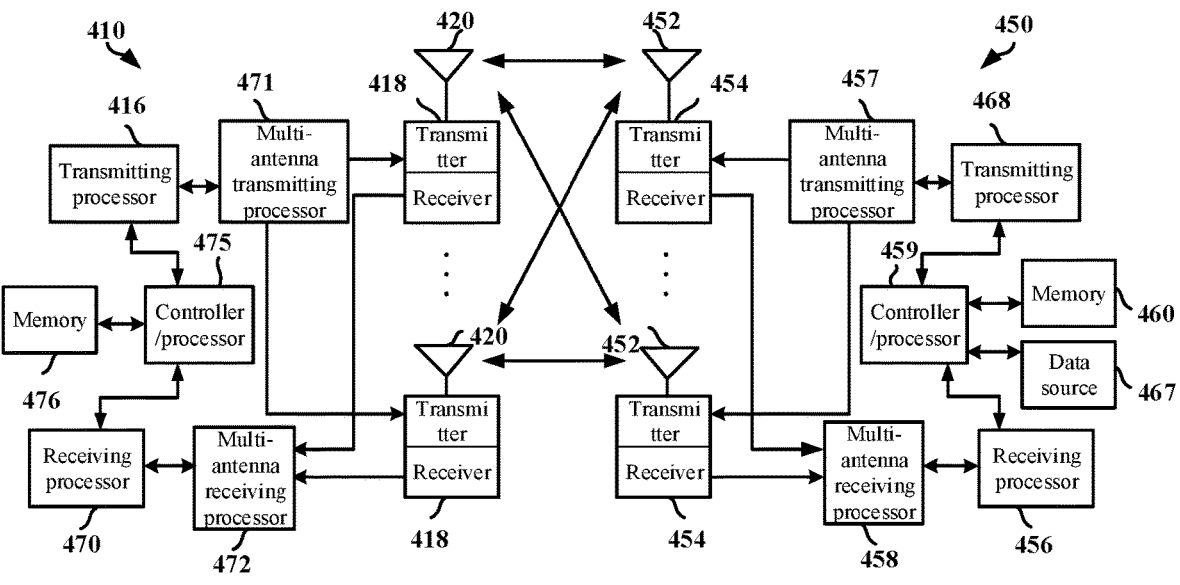
FIG. 4 illustrates a schematic diagram of a first communication device and a second communication device according to one embodiment of the present application.
FIG. 5 illustrates a flowchart of radio signal transmission according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multiantenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least: as a response to a target condition being satisfied, determines whether an RRC connection re-establishment procedure is executed according to at least a state of a first timer; herein, the behavior of determining whether an RRC connection re-establishment procedure is executed according to a state of a first timer comprises: when the first timer is not running, executing the RRC connection re-establishment procedure; when the first timer is running, not executing the RRC connection re-establishment procedure; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the first communication device 450 comprises at least one processor and at least one memory. a memory that stores a computer readable instruction program. The computer readable instruction program generates an action when executed by at least one processor. The action includes: as a response to a target condition being satisfied, determining whether an RRC connection re-establishment procedure is executed according to at least a state of a first timer; herein, the behavior of determining whether an RRC connection re-establishment procedure is executed according to a state of a first timer comprises: when the first timer is not running, executing the RRC connection re-establishment procedure; when the first timer is running, not executing the RRC connection re-establishment procedure; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a first signaling, or, receives a first message; herein, as a response to a target condition being satisfied, at least a state of a first timer is used to determine whether an RRC connection re-establishment procedure is executed; the phrase of at least a state of a first timer being used to determine whether an RRC connection re-establishment procedure is executed comprises: when the first timer is not running, the RRC connection re-establishment procedure is executed; when the first timer is running, the RRC connection re-establishment procedure is not executed; the RRC connection re-establishment procedure being determined to be executed is used to trigger the first signaling, and the first signaling is used to request an RRC connection re-establishment; accompanying the first message being transmitted, the first timer is started; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the second communication device 410 comprises a memory that stores a computer readable instruction program. The computer readable instruction program generates an action when executed by at least one processor. The action includes: receiving a first signaling, or, receiving a first message; herein, as a response to a target condition being satisfied, at least a state of a first timer is used to determine whether an RRC connection re-establishment procedure is executed; the phrase of at least a state of a first timer being used to determine whether an RRC connection re-establishment procedure is executed comprises: when the first timer is not running, the RRC connection re-establishment procedure is executed; when the first timer is running, the RRC connection re-establishment procedure is not executed; the RRC connection re-establishment procedure being determined to be executed is used to trigger the first signaling, and the first signaling is used to request an RRC connection re-establishment; accompanying the first message being transmitted, the first timer is started; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the antenna 452, the transmitter 454, the transmitting processor 468, and the controller/processor 459 are used to transmit a first message; at least one of the antenna 420, the receiver 418, the receiving processor 470, or the controller/processor 475 is used to receive a first message.

In one embodiment, the antenna 452, the transmitter 454, the transmitting processor 468, and the controller/processor 459 are used to transmit a first signaling; at least one of the antenna 420, the receiver 418, the receiving processor 470, or the controller/processor 475 is used to receive a first signaling.

In one embodiment, the antenna 452, the receiver 454, the receiving processor 456, and the controller/processor 459 are used to monitor or receive a target message; at least one of the antenna 420, the transmitter 418, the transmitting processor 416, or the controller/processor 475 is used to transmit a target message.

In one embodiment, the antenna 452, the receiver 454, the receiving processor 456, and the controller/processor 459 are used to monitor or receive a target signaling; at least one of the antenna 420, the transmitter 418, the transmitting processor 416, or the controller/processor 475 is used to transmit a target signaling.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a UE that supports large delay inequality.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTN.

In one embodiment, the second communication device 410 is a satellite equipment.

In one embodiment, the second communication device 410 is flying platform equipment.

In one embodiment, the second communication device 410 is a base station that supports TN.

Embodiment 5

Embodiment 5 illustrates a flowchart of radio signal transmission according to one embodiment in the present application, as shown in FIG. 5. It is particularly underlined that the order illustrated in the embodiment does not put constraints over sequences of signal transmissions and implementations.

The first node U01, in step S5101, determines that a target condition is satisfied; in step S5102($a$), determines that the first timer is not running; in step S5103($s$), as a response to a target condition being satisfied, when the first timer is not running, executes the RRC connection re-establishment procedure; in step S5102($b$), determines that the first timer is running; in step S5103($b$), as a response to a target condition being satisfied, when the first timer is running, does not execute the RRC connection re-establishment procedure;

in embodiment 5, a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, the dotted box F5.1 is optional.

In one embodiment, the dotted box F5.1 exists.

In one embodiment, the dotted box F5.1 does not exist.

In one embodiment, the dotted box F5.2 is optional.

In one embodiment, the dotted box F5.2 exists.

In one embodiment, the dotted box F5.2 does not exist.

In one embodiment, the dotted boxes F5.1 and F5.2 do not exist at the same time.

In one embodiment, one of the dotted boxes F5.1 and F5.2 exists.

Embodiment 6

Figures 6, 7:
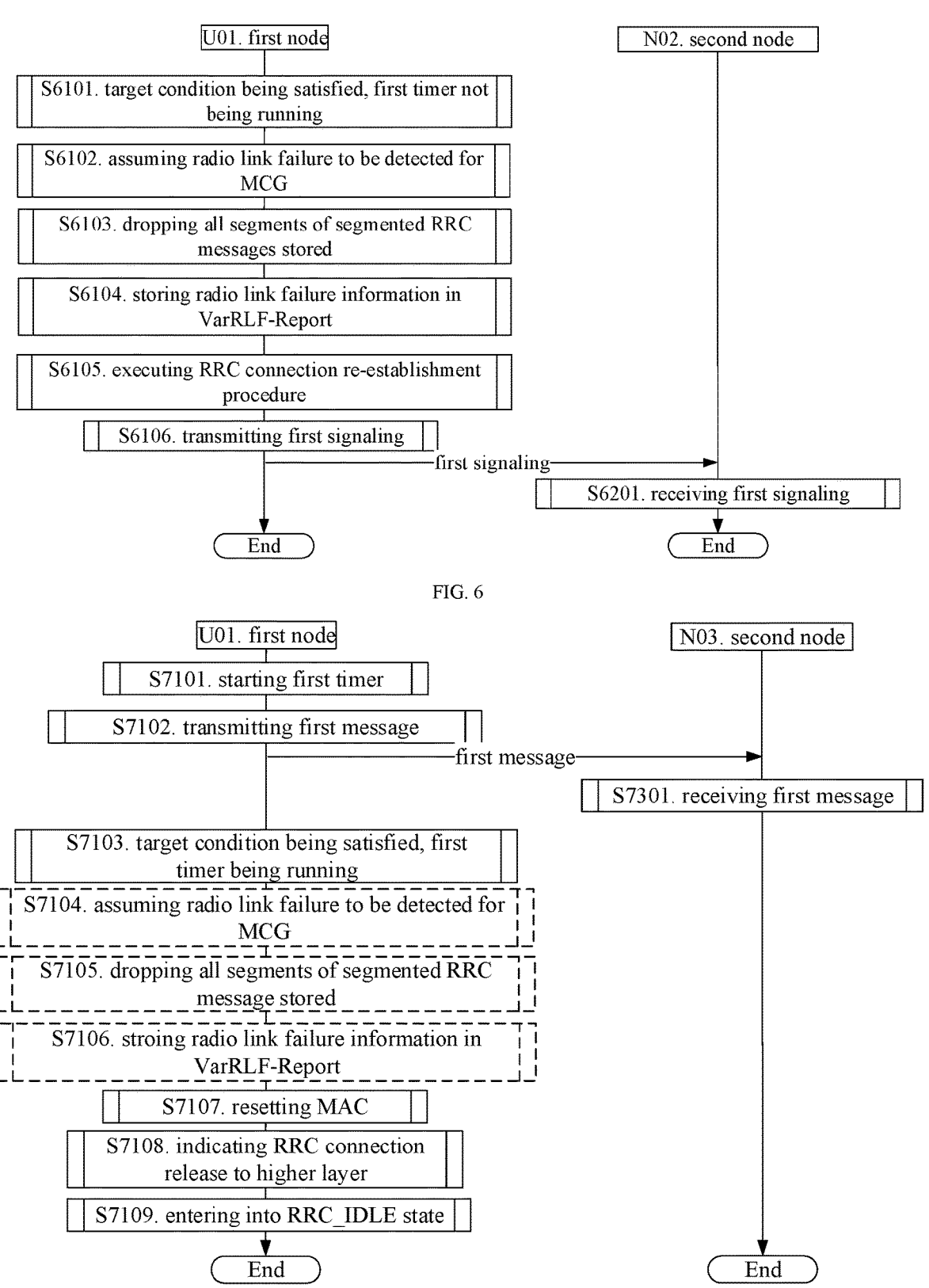
FIG. 6 illustrates a flowchart of radio signal transmission according to another embodiment of the present application.
FIG. 7 illustrates a flowchart of radio signal transmission according to another embodiment of the present application.
Figure 8:
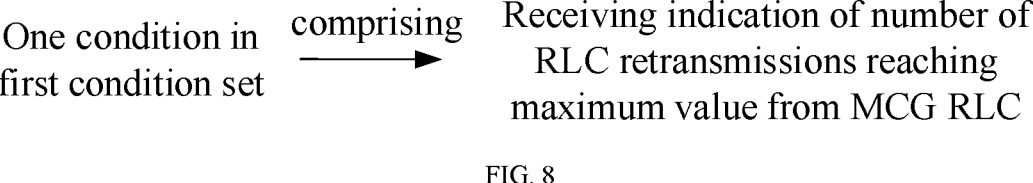
FIG. 8 illustrates a schematic diagram of one condition in a first condition set comprises receiving an indication of a number of RLC retransmissions reaching a maximum value from MCG RLC according to one embodiment of the present application.

Embodiment 6 illustrates a flowchart of radio signal transmission according to another embodiment of the present application, as shown in FIG. 6. It is particularly underlined that the order illustrated in the embodiment does not put constraints over sequences of signal transmissions and implementations.

The first node U01, in step S6101, determines that a target condition is satisfied and the first timer is not running; in step S6102, assumes that an MCG radio link failure is detected; in step S6103, drops all segments of segmented RRC messages stored; in step S6104, stores radio link failure information in VarRLF_Report; in step S6105, as a response to a target condition being satisfied, when the first timer is not running, executes the RRC connection re-establishment procedure; in step S6106, as a response to determining that an RRC connection re-establishment procedure is executed, transmits a first signaling, the first signaling is used to request an RRC connection re-establishment.

The second node N02 receives the first signaling in step S6201.

in embodiment 6, a start condition of the first timer is related to a first message, the first message is used to request transmitting data through a DRB in RRC_I-NACTIVE state, accompanying the first message, at least one DRB is resumed; the target condition is any condition in a first condition set, and the first condition set comprises at least one condition; one condition in the first condition set comprises receiving a random access problem indication from an MCG MAC; when the target condition is satisfied, the first timer is not running.

In one embodiment, the first node U01 is a UE.

In one embodiment, the first node U01 is a base station.

In one embodiment, the second node N02 is a base station.

In one embodiment, the second node N02 is a UE.

In one embodiment, the second node N02 is a relay.

In one embodiment, the second node N02 is a maintenance base station of the target cell.

In one embodiment, the second node N02 is determined by the first node U01 through cell selection.

In one embodiment, the first signaling comprises an RRC message.

In one embodiment, the first signaling comprises at least one RRC IE.

In one embodiment, the first signaling comprises at least one RRC field.

In one embodiment, an SRB of the first signaling is SRB0.

In one embodiment, a logical channel of the first signaling is a CCCH.

In one embodiment, the first signaling is an RRCReestablishmentRequest message.

In one embodiment, the first signaling comprises a ReestabUE-Identity.

In one embodiment, the first signaling comprises a ReestablishmentCause.

In one embodiment, as a response to the first signaling being transmitted, monitor a target signaling, and the target signaling is an RRC message.

In one embodiment, as a response to the first signaling being transmitted, receive a target signaling, and the target signaling is an RRC message.

In one embodiment, the target signaling comprises an RRCReestablishment message.

In one embodiment, the target signaling comprises an RRCSetup message.

In one embodiment, the first timer is not started.

In one embodiment, as a response to the target condition being satisfied, if the first timer is not running, before executing the RRC connection re-establishment, assume that radio link failure is detected for the MCG, i.e. MCG RLF.

In one embodiment, as a response to the target condition being satisfied, if the first timer is not running, and before executing the RRC connection re-establishment, drop all segments of segmented RRC messages stored.

In one embodiment, as a response to the target condition being satisfied, if the first timer is not running, before executing the RRC connection re-establishment, store radio link failure information in VarRLF-Report.

In one embodiment, as a response to the target condition being satisfied, if the first timer is not running, assume that radio link failure is detected for MCG, drop all segments of segmented RRC messages stored, store radio link failure information in VarRLF-Report, and execute the RRC connection re-establishment procedure.

In one embodiment, according to section 5.7.6.3 in TS 38.331, drop all segments of segmented RRC messages stored.

In one embodiment, according to section 5.3.10.5 in TS 38.331, store radio link failure information in VarRLF-Report.

In one embodiment, the step S6106 belongs to the step S6105.

In one embodiment, the step S6105 comprises the step S6106.

Embodiment 7

Embodiment 7 illustrates a flowchart of radio signal transmission according to another embodiment in the present application, as shown in FIG. 7. It is particularly underlined that the order illustrated in the embodiment does not put constraints over sequences of signal transmissions and implementations.

The first node U01, in step S7101, accompanying a first message, starts the first timer; in step S7102, transmits the first message; in step S7103, determines that a target condition is satisfied and the first timer is running; in step S7104, assumes that radio link failure to be detected for an MCG; in step S7105, drops all segments of segmented RRC messages stored; in step S7106, stores radio link failure information in VarRLF_Report; in step S7107, before entering into RRC_IDLE state, resets a MAC; in step S7108, before entering into RRC_IDLE state, indicates an RRC connection release to a higher layer; in step S7109, enters into the RRC_IDLE state;

The second node N03 receives the first signaling in step S7301.

in embodiment 7, a start condition of the first timer is related to a first message, the first message is used to request transmitting data through a DRB in RRC_I-NACTIVE state, accompanying the first message, at least one DRB is resumed; the target condition is any condition in a first condition set, and the first condition set comprises at least one condition; one condition in the first condition set comprises receiving a random access problem indication from an MCG MAC; when the target condition is satisfied, the first timer is running.

In one embodiment, as a response to the first message being transmitted, monitor a target message.

In one embodiment, when the target condition is satisfied, the target message is not received.

In one embodiment, the behavior of not executing the RRC connection re-establishment procedure in the present application is entering into the RRC_IDLE state.

In one embodiment, the second node N03 is a base station.

In one embodiment, the second node N03 is a UE.

In one embodiment, the second node N03 is a relay device.

In one embodiment, the second node N03 is a maintenance base station of a cell in a Radio Access Network (RAN)-based Notification Area (RNA) of the first node U01.

In one embodiment, the second node is a maintenance base station when the first node U01 enters into RRC_I-NACTIVE State.

In one embodiment, the RNA comprises at least one cell.

In one embodiment, the RNA is configured through an RRC message.

In one embodiment, the RNA is configured through an RRCRelease message.

In one embodiment, the RNA comprises a cell list, and the first cell is a cell in the cell list.

In one embodiment, the RNA comprises a List of RAN areas, and the first cell belongs to an RAN area in the List of RAN areas.

In one embodiment, as a response to all conditions in a given condition set being satisfied, start the first timer.

In one embodiment, as a response to all conditions in a given condition set being satisfied, transmit the first message.

In one embodiment, as a response to all conditions in a given condition set being satisfied, start the first timer and transmit the first message.

In one embodiment, a receiver of the first message is a maintenance base station of the target cell.

In one embodiment, the first message is transmitted in RRC_INACTIVE State.

In one embodiment, the first message is transmitted in a random access procedure.

In one subembodiment of the above embodiment, the first message is transmitted in Message 3 (Msg3).

In one subembodiment of the above embodiment, the first message is transmitted in Message A (MsgA).

In one embodiment, the first message is transmitted through pre-configured uplink resources.

In one subembodiment of the above embodiment, the pre-configured uplink resources are configured through cg-SDT-Config.

In one subembodiment of the above embodiment, the pre-configured uplink resources are CG-SDT resources.

In one subembodiment of the above embodiment, the pre-configured uplink resources are PUSCH resources.

In one embodiment, the behavior of starting the first timer refers to: start the first timer.

In one embodiment, the behavior of starting the first timer refers to: enable the first timer to start timing.

In one embodiment, before entering into RRC_IDLE state, if there exists UE Inactive AS context, then drop the UE Inactive AS context.

In one embodiment, before entering into RRC_IDLE state, if suspendConfig is configured, release suspendConfig.

In one embodiment, the behavior of indicating the release of the RRC connection to a higher layer together with the release cause In one embodiment, the higher layer is a protocol layer above RRC.

In one embodiment, the higher layer is an AS layer.

In one embodiment, the release cause is used to indicate an SDT failure.

In one embodiment, the release cause is used to indicate that a radio link failure occurs in RRC_INACTIVE State.

In one embodiment, the release cause is other.

In one embodiment, the release cause is RRC connection failure.

In one embodiment, the release cause is SDT failure.

In one embodiment, the release cause is SDT failure.

In one embodiment, the release cause is small data transmission failure.

In one embodiment, the behavior of resetting a MAC refers to: only resetting a MAC of an MCG.

In one embodiment, the behavior of resetting a MAC refers to: resetting a MAC of an MCG and an SCG.

In one embodiment, the behavior of setting a MAC comprises: stopping all timers of a MAC layer of an MCG.

In one embodiment, the behavior of setting a MAC comprises: setting all New Data Indicators of an uplink HARQ process to 0.

In one embodiment, the behavior of setting a MAC comprises: cleaning all soft buffers of a downlink HARQ process.

In one embodiment, the phrase of "when the target condition is satisfied, the first timer is running" refers to: a time interval from a time when the first timer is started to a time when the target condition is satisfied is less than an expiration value of the first timer.

In one embodiment, the phrase of "when the target condition is satisfied, the first timer is running" refers to: a time interval from a time when the first timer is started to a time when the target condition is satisfied is not greater than an expiration value of the first timer.

In one embodiment, the phrase of "when the target condition is satisfied, the first timer is running" refers to: when the target condition is satisfied, a timing of the first timer is less than an expiration value of the first timer.

In one embodiment, the phrase of "when the target condition is satisfied, the first timer is running" refers to: when the target condition is satisfied, a timing of the first timer is not greater than an expiration value of the first timer.

In one embodiment, the behavior of not executing the RRC connection re-establishment procedure is entering into the RRC_IDLE state.

In one embodiment, the behavior of "before entering into RRC_IDLE state, resetting a MAC, and indicating an RRC connection release to a higher layer" comprises: as a response to a target condition being satisfied, when the first timer is running, firstly resetting MAC, then indicating an RRC connection release to a higher layer, and then entering into RRC_IDLE state.

In one embodiment, the first timer is started.

In one embodiment, if a target condition is satisfied and the first timer is running, the first node U01 resets MAC, indicates an RRC connection release to a higher layer, and enters into RRC_IDLE state.

In one embodiment, as a response to the target condition being satisfied, and when the first timer is running, determine whether it is assumed that a radio link failure is detected for an MCG according to whether any search space in a given search space set is being monitored.

In one subembodiment of the embodiment, if any search space in a given search space set is being monitored, assume that a radio link failure is detected for an MCG.

In one subembodiment of the embodiment, if any search space in a given search space set is not being monitored, don't assume a radio link failure is detected for an MCG.

In one embodiment, as a response to the target condition being satisfied, when the first timer is running, determine whether all segments of segmented RRC messages stored are dropped according to whether any search space in a given search space set is being monitored.

In one subembodiment of the embodiment, if any search space in a given search space set is being monitored, drop all segments of segmented RRC messages stored.

In one subembodiment of the embodiment, if any search space in a given search space set is not being monitored, don't drop all segments of segmented RRC messages stored.

In one embodiment, as a response to the target condition being satisfied, when the first timer is running, determine whether radio link failure information is stored in VarRLF-Report according to whether any search space in a given search space set is being monitored.

In one subembodiment of the embodiment, if any search space in a given search space set is being monitored, store radio link failure information in VarRLF-Report.

In one subembodiment of the embodiment, if any search space in a given search space set is not being monitored, don't store radio link failure information in VarRLF-Report.

In one embodiment, one search space in the given search space set is sdt-CG-SearchSpace.

In one embodiment, one search space in the given search space set is sdt-SearchSpace.

In one embodiment, one search space in the given search space set is a USS.

In one embodiment, one search space in the given search space set is a CSS.

In one embodiment, the first node monitors a PDCCH on a search space in the given search space set, and detects a CRC's DCI format 0_0 scrambled by a C-RNTI or CS-RNTI, or CRC's DCI format 1_0 scrambled by a C-RNTI.

In one embodiment, a search space in the given search space set comprises a Type1-PDCCH CSS set.

In one embodiment, a search space in the given search space set comprises a Type1A-PDCCH CSS set.

In one embodiment, a search space in the given search space set comprises a USS configured by a SearchSpace in PDCCH-Config, where searchSpaceType=ue-Specific.

In one embodiment, whether it is assumed that a radio link failure is detected for an MCG is unrelated to whether any search space in a given search space set is being monitored.

In one embodiment, whether all segments of segmented RRC messages stored are dropped is unrelated to whether any search space in a given search space set is being monitored.

In one embodiment, whether radio link failure information is stored in VarRLF-Report is unrelated to whether any search space in a given search space set is being monitored.

In one embodiment, as a response to the target condition being satisfied, and when the first timer is running, determine whether it is assumed that a radio link failure is detected for an MCG according to whether the target condition belongs to a first condition subset.

In one subembodiment of the embodiment, if the target condition belongs to the first condition subset, assume that a radio link failure is detected for an MCG.

In one subembodiment of the embodiment, if the target condition does not belong to the first condition subset, assume that a radio link failure is detected for an MCG.

In one embodiment, as a response to the target condition being satisfied, when the first timer is running, determine whether all segments of segmented RRC messages stored are dropped according to whether the target condition belongs to a first condition subset.

In one subembodiment of the embodiment, if the target condition belongs to the first condition subset, drop all segments of segmented RRC messages stored.

In one subembodiment of the embodiment, if the target condition does not belong to the first condition subset, don't drop all segments of segmented RRC messages stored.

In one embodiment, as a response to the target condition being satisfied, when the first timer is running, determine whether radio link failure information is stored in VarRLF-Report according to whether the target condition belongs to a first condition subset.

In one subembodiment of the embodiment, if the target condition belongs to the first condition subset, store radio link failure information in VarRLF-Report.

In one subembodiment of the embodiment, if the target condition does not belong to the first condition subset, don't store radio link failure information in VarRLF-Report.

In one embodiment, whether it is assumed that a radio link failure is detected for an MCG is unrelated to whether the target condition belongs to a first condition subset.

In one embodiment, whether all segments of segmented RRC message stored are dropped is unrelated to whether the target condition belongs to a first condition subset.

In one embodiment, whether radio link failure information is stored in VarRLF-Report is unrelated to whether the target condition belongs to a first condition subset.

In one embodiment, the first condition subset comprises at least one condition in the first condition set.

In one embodiment, the first condition subset is the same as the first condition set.

In one embodiment, the first condition subset is an actual subset in the first condition set.

In one embodiment, the step S7101 is taken before the step S7102.

In one embodiment, the step S7101 is taken after the step S7102.

In one embodiment, the step S7104 is optional.

In one embodiment, the step S7105 is optional.

In one embodiment, the step S7106 is optional.

In one embodiment, the step S7104 exists.

In one embodiment, if the step S7104 exists, as a response to the target condition being satisfied, if the first timer is running, and before entering into RRC_IDLE state, assume that a radio link failure is detected for an MCG.

In one embodiment, the step S7104 does not exist.

In one embodiment, if the step S7104 does not exist, as a response to the target condition being satisfied, if the first timer is running, and before entering into RRC_IDLE state, don't assume that a radio link failure is detected for an MCG.

In one embodiment, the step S7105 exists.

In one embodiment, if the step S7105 exists, as a response to the target condition being satisfied, if the first timer is running, and before entering into RRC_IDLE state, drop all segments of segmented RRC message stored.

In one embodiment, the step S7105 does not exist.

In one embodiment, if the step S7105 does not exist, as a response to the target condition being satisfied, if the first timer is running, and before entering into RRC_IDLE state, don't drop all segments of segmented RRC message stored.

In one embodiment, the step S7106 exists.

In one embodiment, if the step S7106 exists, as a response to the target condition being satisfied, if the first timer is running, and before entering into RRC_IDLE state, store radio link failure information in VarRLF-Report.

In one embodiment, the step S7106 does not exist.

In one embodiment, if the step S7106 does not exist, as a response to the target condition being satisfied, if the first timer is running, and before entering into RRC_IDLE state, don't store radio link failure information in VarRLF-Report.

In one embodiment, at least one of the step S7104, or the step S7105, or the step S7106 does not exist.

In one embodiment, at least one of the step S7104, or the step S7105, or the step S7106 exists.

In one embodiment, as a response to the target condition being satisfied, when the first timer is running, directly enter into RRC_IDLE state.

In one embodiment, as a response to the target condition being satisfied, if the first timer is running, assume that a radio link failure is detected for an MCG, and enter into RRC_IDLE state.

In one embodiment, as a response to the target condition being satisfied, if the first timer is running, assume that a radio link failure is detected for MCG, store radio link failure information in VarRLF-Report, and enter into RRC_IDLE state.

In one embodiment, as a response to the target condition being satisfied, if the first timer is running, assume that a radio link failure is detected for MCG, drop all segments of segmented RRC messages stored, store radio link failure information in VarRLF-Report, and enter into RRC_IDLE state.

In one embodiment, as a response to the target condition being satisfied, if the first timer is running, assume that a radio link failure is detected for an MCG, drop all segments of segmented RRC message stored, and enter into RRC_IDLE state.

Embodiment 8

Embodiment 8 illustrates a schematic diagram of one condition in a first condition set comprises receiving an indication of a number of RLC retransmissions reaching a maximum value from MCG RLC according to one embodiment of the present application.

In embodiment 8, one condition in the first condition set comprises receiving an indication of a number of RLC retransmissions reaching a maximum value from MCG RLC.

In one embodiment, the first node is not configured with a CA.

In one embodiment, the first node is configured with a CA.

In one embodiment, the first node is not configured with a CA duplication.

In one embodiment, the first node is configured with a CA duplication, and is not activated for an MCG.

In one embodiment, the first node is configured with a CA duplication, and is activated for an MCG, as well as for a corresponding logical channel allowedServingCells only includes a PCell.

In one embodiment, the first node is not configured with a CA; the first node is not configured with a CA duplication; or, a CA duplication is configured, and is not activated for an MCG; or, the first node is configured with a CA duplication, and is activated for an MCG, as well as for a corresponding logical channel allowedServingCells only includes a PCell.

In one embodiment, one condition in the first condition set comprising receiving an indication of a number of RLC retransmissions reaching a maximum value from MCG RLC refers to: one condition in the first condition set is receiving an indication of a number of RLC retransmissions reaching a maximum value from MCG RLC.

In one embodiment, the target condition is receiving an indication of a number of RLC retransmissions reaching a maximum value from MCG RLC.

In one embodiment, receiving an indication of a number of RLC retransmissions reaching a maximum value from MCG RLC is to determine that the target condition is satisfied.

In one embodiment, a number of the RLC retransmissions reaching a maximum value refers to: a number of retransmissions of an RLC SDU or an RLC SDU segments reaches a first threshold.

In one embodiment, a first counter is used to count a number of retransmissions of the RLC SDU or the RLC SDU segments.

In one embodiment, the first counter is an RLC-layer counter.

In one embodiment, the first counter is RETX_COUNT.

In one embodiment, the first counter reaching the first threshold is used to determine transmitting the indication of a number of the RLC retransmissions reaching a maximum number.

In one embodiment, when the first counter reaches the first threshold, determine that a number of RLC retransmissions reaches a maximum number.

In one embodiment, when the first counter reaches the first threshold, MCG RLC transmits an indication of a number of RLC retransmissions reaching a maximum value to an RRC layer.

In one embodiment, a number of the RLC retransmissions reaching a maximum value refers to: a number of the RLC retransmissions reaches the first threshold.

In one embodiment, a number of the RLC retransmissions reaching a maximum value refers to: RETX_COUNT reaches maxRetxThreshold.

In one embodiment, a number of the RLC retransmissions reaching a maximum value refers to: RETX_COUNT of an MCG RLC entity reaches maxRetxThreshold.

In one embodiment, the first threshold is configurable.

In one embodiment, the first threshold is pre-configured.

In one embodiment, the first threshold is configured through an RRC message.

In one embodiment, the first threshold is a default configuration.

In one embodiment, the first threshold is a maximum value.

In one embodiment, the first threshold is a maximum number of RLC retransmissions.

In one embodiment, the first threshold is used to limit a maximum number of an RLC SDU being retransmitted.

In one embodiment, the first threshold is used by a transmitting end of an Acknowledged Mode (AM) RLC entity to limit a number of an RLC SDU being retransmitted.

In one embodiment, the first threshold is a value of maxRetxThreshold.

In one embodiment, the first threshold is configured through maxRetxThreshold.

In one embodiment, the first threshold is a positive integer.

In one embodiment, the first threshold is equal to 1, or the first threshold is equal to 2, or the first threshold is equal to 3, or the first threshold is equal to 4, or the first threshold is equal to 6, or the first threshold is equal to 8, or the first threshold is equal to 16, or the first threshold is equal to 32.

In one embodiment, the RLC retransmission refers to a retransmission of an RLC SDU.

In one embodiment, the RLC retransmission refers to a retransmission of an RLC SDU segment.

Embodiment 9

Figure 9:
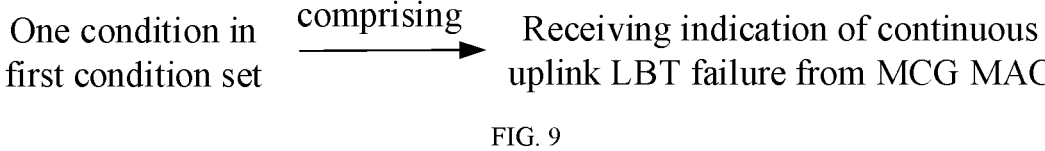
FIG. 9 illustrates a schematic diagram of one condition in a first condition comprising receiving an indication of continuous uplink LBT failure from an MCG MAC according to one embodiment of the present application.

Embodiment 9 illustrates a schematic diagram of one condition in a first condition set comprising receiving an indication of continuous uplink LBT failure from an MCG MAC according to one embodiment of the present application, as shown in FIG. 9.

In embodiment 9, one condition in the first condition set comprises receiving an indication of continuous uplink LBT failure from an MCG MAC.

In one embodiment, one condition in the first condition set comprising receiving an indication of continuous uplink LBT failure from an MCG MAC refers to: one condition in the first condition set is receiving an indication of continuous uplink LBT failure from an MCG MAC.

In one embodiment, one condition in the first condition set comprising receiving an indication of continuous uplink LBT failure from an MCG MAC refers to: one condition in the first condition set is receiving an indication of continuous uplink LBT failure from an MCG MAC, and timer T304 is not running.

In one embodiment, one condition in the first condition set comprising receiving an indication of continuous uplink LBT failure from an MCG MAC refers to: one condition in the first condition set is when timer T304 is not running, receive an indication of continuous uplink LBT failure from an MCG MAC.

In one embodiment, the timer T304 belongs to an MCG.

In one embodiment, when an indication of continuous uplink LBT failure is received from MCG MAC, the target condition is satisfied.

In one embodiment, receiving an indication of continuous uplink LBT failure from an MCG MAC is used to determine that the target condition is satisfied.

In one embodiment, the continuous uplink LBT fails.

In one embodiment, a second counter not being less than a second threshold is used to determine transmitting the continuous uplink LBT failure indication.

In one embodiment, when a second counter is not less than a second threshold, and continuous LBT failure is triggered on all UL BWPs configured with PRACH occasions, continuous LBT failure is indicated to a higher layer.

In one embodiment, the second counter is a MAC-layer counter.

In one embodiment, the second counter is LBT_ COUNTER.

In one embodiment, the second threshold is configurable.

In one embodiment, the second threshold is pre-configured.

In one embodiment, the second threshold is configured through an RRC message.

In one embodiment, the second threshold is lbt-FailureInstanceMaxCount.

In one embodiment, the second threshold is configured through lbt-FailureInstanceMaxCount.

In one embodiment, the second threshold is a positive integer.

Embodiment 10

Figure 10:
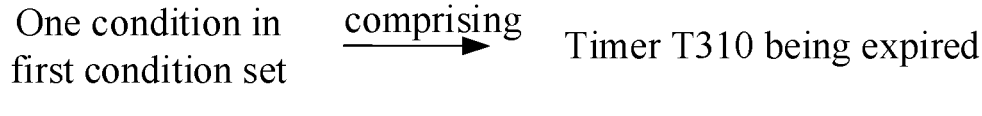
FIG. 10 illustrates a schematic diagram of one condition in a first condition set comprising that timer T310 being expired according to one embodiment of the present application.

Embodiment 10 illustrates a schematic diagram of one condition in a first condition set comprising that timer T310 is expired according to one embodiment of the present application, as shown in FIG. 10.

In embodiment 10, one condition in the first condition set comprises that timer T310 is expired.

In one embodiment, one condition in the first condition set comprising that timer T310 is expired refers to: one condition in the first condition set is that the timer T310 is expired.

In one embodiment, the timer T310 being expired is used to determine that the target condition is satisfied.

In one embodiment, when the timer T310 is expired, the target condition is satisfied.

In one embodiment, the target condition is that the timer T310 is expired.

In one embodiment, the timer T310 being expired refers to that the timer T310 of the PCell is expired.

In one embodiment, the timer T310 is associated with a PCell group.

In one embodiment, the timer T310 is associated with a PCell.

In one embodiment, the timer T310 is T310 of a PCell.

In one embodiment, the timer T310 is used for Radio Link Monitoring.

In one embodiment, the timer T310 is used for detecting physical-layer problems.

In one embodiment, when physical-layer problems are detected, the timer T310 is started.

In one embodiment, when continuous N310 out-of-sync indications are received from lower layer, the timer T310 is started.

In one embodiment, during the timer T310 is running, if continuous N311 in-sync indications are received, the timer T310 is stopped.

In one embodiment, during the timer T310 is running, if an RRCReconfiguration message carrying reconfiguration-WithSync is received, the timer T310 is stopped.

In one embodiment, during the timer T310 is running, if a MobilityFromNRCommand message is received, the timer T310 is stopped.

In one embodiment, during the timer T310 is running, if a rlf-TimersAndConstant message is received, the timer T310 is stopped.

In one embodiment, during the timer T310 is running, if an RRC connection re-establishment procedure is initiated, the timer T310 is stopped.

In one embodiment, during the timer T310 is running, if condition re-configuration is executed, the timer T310 is stopped.

In one embodiment, during the timer T310 is running, if an MCG failure information procedure is initiated, the timer T310 is stopped.

In one embodiment, the timer T310 reaching an expiration value of the timer T310 is used to determine that the timer T310 is expired, In one embodiment, the expiration value of the timer T310 is configured through an RRC message.

In one embodiment, the RRC message is an SIB1 message.

In one embodiment, the RRC message is an RRCReconfiguration message.

In one embodiment, the RRC message is an RRCResume message.

In one embodiment, the RRC message is an RRCSetup message.

In one embodiment, the RRC message is an RRCRelease message.

In one embodiment, the expiration value of the timer T310 is configured through an RRC IE in the RRC message.

In one embodiment, the expiration value of the timer T310 is configured through an RRC field in the RRC message.

In one embodiment, the expiration value of the timer T310 is configured through a UE-TimersAndConstants IE in the RRC message.

In one embodiment, the expiration value of the timer T310 is configured through an RLF-TimersAndConstants IE in the RRC message.

In one embodiment, the expiration value of the timer T310 is configured through a SuspendConfig field in the RRC message.

In one embodiment, the expiration value of the timer T310 is configured through a t310 field in the RRC message.

Embodiment 11

Figure 11:
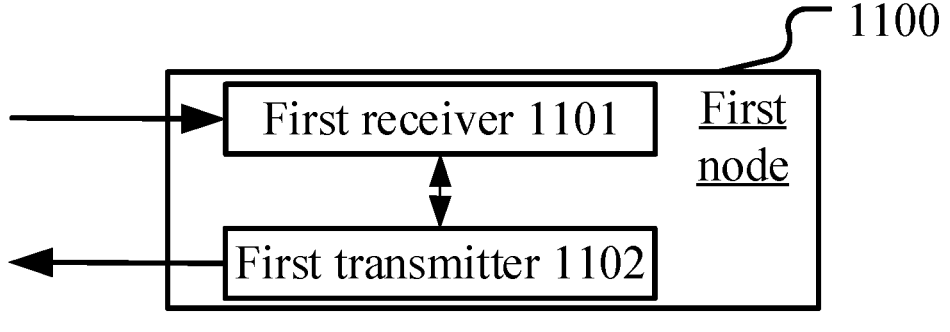
FIG. 11 illustrates a structure block diagram of a processor in a first node according to one embodiment of the present application.

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102.

The first receiver 1101, as a response to a target condition being satisfied, determines whether an RRC connection re-establishment procedure is executed according to at least a state of a first timer;

in embodiment 11, the behavior of determining whether an RRC connection re-establishment procedure is executed according to a state of a first timer comprises: when the first timer is not running, executing the RRC connection re-establishment procedure; when the first timer is running, not executing the RRC connection re-establishment procedure; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, one condition in the first condition set comprises receiving an indication of a number of RLC retransmissions reaching a maximum value from MCG RLC.

In one embodiment, one condition in the first condition set comprises receiving an indication of continuous uplink LBT failure from an MCG MAC.

In one embodiment, one condition in the first condition set comprises that timer T310 is expired.

In one embodiment, a first transmitter 1102, as a response to determining executing an RRC connection re-establishment procedure, transmits a first signaling, the first signaling is used to request an RRC connection re-establishment; herein, when the target condition is satisfied, the first timer is not running.

In one embodiment, the first transmitter 1102 transmits the first message; accompanying the first message, starts the first timer; the first receiver 1101, before entering into RRC_IDLE state, resets a MAC, and indicates an RRC connection release to a higher layer; herein, when the target condition is satisfied, the first timer is running; the behavior of not executing the RRC connection re-establishment procedure comprises entering into the RRC_IDLE state.

In one embodiment, the first receiver 1101, as a response to the first message being transmitted, monitors a target message.

In one embodiment, the first receiver 1101, as a response to the first signaling being transmitted, monitors a target signaling.

In one embodiment, the first receiver 1101 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises the antenna 452, the receiver 454, the multi-antenna receiving processor 458 and the receiving processor 456 in FIG. 4 of the present application.

In one embodiment, the first receiver 1101 comprises the antenna 452, the receiver 454 and the receiving processor 456 in FIG. 4 of the present application.

In one embodiment, the first transmitter 1102 comprises the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises the antenna 452, the transmitter 454, the multi-antenna transmitting processor 457 and the transmitting processor 468 in FIG. 4 of the present application.

In one embodiment, the first transmitter 1102 comprises the antenna 452, the transmitter 454 and the transmitting processor 468 in FIG. 4 of the present application.

Embodiment 12

Figure 12:
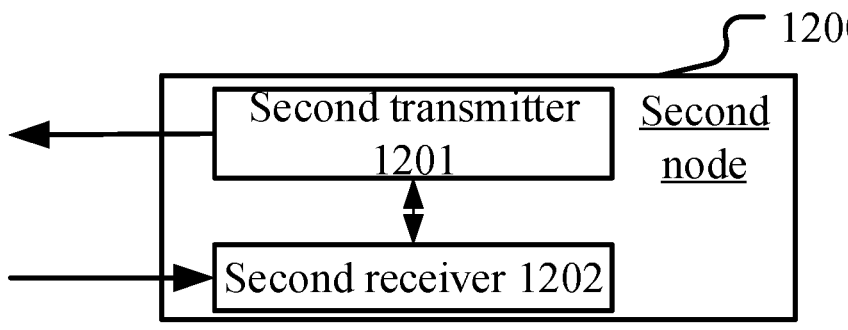
FIG. 12 illustrates a structure block diagram of a processor in a second node according to one embodiment of the present application.

Embodiment 12 illustrates a structure block diagram of a processor in a second node according to one embodiment of the present application, as shown in FIG. 12. In FIG. 12, a processor 1200 in a second node comprises a second transmitter 1201 and a second receiver 1202.

a second receiver 1202, receives a first signaling, or, receives a first message;

in embodiment 12, as a response to a target condition being satisfied, at least a state of a first timer is used to determine whether an RRC connection re-establishment procedure is executed; the phrase of at least a state of a first timer being used to determine whether an RRC connection re-establishment procedure is executed comprises: when the first timer is not running, the RRC connection re-establishment procedure is executed; when the first timer is running, the RRC connection re-establishment procedure is not executed; the RRC connection re-establishment procedure being determined to be executed is used to trigger the first signaling, and the first signaling is used to request an RRC connection re-establishment; accompanying the first message being transmitted, the first timer is started; a start condition of the first timer is related to a first message, the first message is used to request transmitting data through a DRB in RRC_INACTIVE state, accompanying the first message, at least one DRB is resumed; the target condition is any condition in a first condition set, and the first condition set comprises at least one condition; one condition in the first condition set comprises receiving a random access problem indication from an MCG MAC.

In one embodiment, one condition in the first condition set comprises receiving an indication of a number of RLC retransmissions reaching a maximum value from MCG RLC.

In one embodiment, one condition in the first condition set comprises receiving an indication of continuous uplink LBT failure from an MCG MAC.

In one embodiment, one condition in the first condition set comprises that timer T310 is expired.

In one embodiment, the phrase of the RRC connection re-establishment procedure not being executed comprises entering into RRC_IDLE state; before entering into the RRC_IDLE state, a MAC is reset, and an RRC connection release is indicated to a higher layer.

In one embodiment, the second transmitter 1201, as a response to the first message being received, transmits a target message.

In one embodiment, the second transmitter 1201, as a response to the first signaling being received, transmits a target signaling.

In one embodiment, the second transmitter 1201 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises the antenna 420, the transmitter 418, the multi-antenna transmitting processor 471 and the transmitting processor 416 in FIG. 4 of the present application.

In one embodiment, the second transmitter 1201 comprises the antenna 420, the transmitter 418 and the transmitting processor 416 in FIG. 4 of the present application.

In one embodiment, the second receiver 1202 comprises the antenna 420, the receiver 418, the multi-antenna receiving processor 472, the receiving processor 470, the controller/processor 475 and the memory 476 in FIG. 4 of the present application.

In one embodiment, the second receiver 1202 comprises the antenna 420, the receiver 418, the multi-antenna receiving processor 472 and the receiving processor 470 in FIG. 4 of the present application.

In one embodiment, the second receiver 1202 comprises the antenna 420, the receiver 418 and the receiving processor 470 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:
   a transceiver; and
   a processor, wherein:
   the transceiver is configured to receive information indicating a value of a first timer, wherein the first timer is a timer related to small data transfer (SDT);
   the processor is configured to start the first timer based on a first message, wherein the first message is used to request transmitting data through a data radio bearer (DRB) in a radio resource control (RRC) inactive state; and
   the processor is configured to determine whether to execute an RRC connection re-establishment procedure based on at least a target condition being satisfied and a state of the first timer, wherein the target condition is a condition in a condition set, wherein the condition set comprises: receiving a random access problem indication from a master cell group (MCG) medium access control (MAC) and a state of at least a plurality of second timers.

2. The UE of claim 1, wherein the plurality of second timers comprises: T300, T301, T304, T311 and T319.

3. The UE of claim 1, wherein the processor is configured to determine to execute the RRC connection re-establishment procedure in response to: receiving the random access problem indication from the MCG MAC, the first timer not running, and the plurality of second timers not running.

4. The UE of claim 1, wherein the processor is configured to determine to not execute the RRC connection re-establishment procedure in response to: not receiving the random access problem indication from MCG MAC, the first timer is running, or at least one of the plurality of second timers is running.

5. The UE of claim 1, wherein the condition set comprises receiving an indication of a number of radio link control (RLC) retransmissions reaching a maximum value from a MCG RLC.

6. The UE of claim 1, wherein the condition set comprises receiving an indication of continuous uplink listen before talk (LBT) failures from a MCG MAC.

7. The UE of claim 1, wherein the transceiver is configured to, in response to a determination to execute the RRC connection re-establishment procedure, transmit a second message requesting the RRC connection re-establishment.

8. The UE of claim 1, wherein the transceiver is configured to transmit the first message in an RRC inactive state.

9. The UE of claim 1, wherein the processor is configured to enter into an RRC idle state in response to a determination to not execute the RRC connection re-establishment procedure.

10. The UE of claim 9, wherein the processor is configured to, before entering into RRC idle state: reset a MAC; and indicate an RRC connection release to a higher layer.

11. A method for use in a user equipment (UE) configured for wireless communications, the method comprising:
   receiving information indicating a value of a first timer, wherein the first timer is a timer related to small data transfer (SDT);

starting the first timer based on a first message, wherein the first message is used to request transmitting data through a data radio bearer (DRB) in a radio resource control (RRC) inactive state; and determining whether to execute an RRC connection re-establishment procedure based on at least a target condition being satisfied and a state of the first timer, wherein the target condition is a condition in a condition set, wherein the condition set comprises: receiving a random access problem indication from a master cell group (MCG) medium access control (MAC) and a state of at least a plurality of second timers.

12. The method of claim 11, wherein the plurality of second timers comprises: T300, T301, T304, T311 and T319.

13. The method of claim 11, further comprising:

determining to execute the RRC connection re-establishment procedure in response to: receiving the random access problem indication from the MCG MAC, the first timer not running, and the plurality of second timers not running.

14. The method of claim 11, further comprising:

determining to not execute the RRC connection re-establishment procedure in response to: not receiving the random access problem indication from MCG MAC, the first timer is running, or at least one of the plurality of second timers is running.

15. The method of claim 11, wherein the condition set comprises receiving an indication of a number of radio link control (RLC) retransmissions reaching a maximum value from a MCG RLC.

16. The method of claim 11, wherein the condition set comprises receiving an indication of continuous uplink listen before talk (LBT) failures from a MCG MAC.

17. The method of claim 11, further comprising:

in response to a determination to execute the RRC connection re-establishment procedure, transmitting a second message requesting the RRC connection re-establishment.

18. The method of claim 11, further comprising:

transmitting the first message in an RRC inactive state.

19. The method of claim 11, further comprising:

entering into an RRC idle state in response to a determination to not execute the RRC connection re-establishment procedure.

20. The method of claim 19, further comprising:

before entering into RRC idle state: resetting a MAC; and indicating an RRC connection release to a higher layer.

\* \* \* \* \*